United States Patent

Streicher et al.

[15] 3,645,612

[45] Feb. 29, 1972

[54] READER FOR INFORMATION CARRIERS IN SHEET FORM

[72] Inventors: Heinz Streicher, Echterdingen; Siegfried Riek, Esslingen-Weil; Manfred Leutwein, Rommelshausen, all of Germany

[73] Assignee: Eastman Kodak Company, Rochester, N.Y.

[22] Filed: Nov. 12, 1969

[21] Appl. No.: 875,791

[30] Foreign Application Priority Data

Nov. 16, 1968 Germany ......................P 18 09 313.5

[52] U.S. Cl. ................................................353/27, 353/113

[51] Int. Cl. .......................................................G03b 23/08

[58] Field of Search .....................353/7, 8, 9, 25, 26, 27, 113

[56] References Cited

UNITED STATES PATENTS

| | | | |
|---|---|---|---|
| 2,653,511 | 9/1953 | Correa | 353/9 |
| 2,904,914 | 9/1959 | Trubert | 353/113 |
| 2,914,985 | 12/1959 | Badalich | 353/9 |
| 2,933,979 | 4/1960 | Lacoe | 353/113 |
| 2,968,217 | 1/1961 | Ewald | 353/7 |
| 3,183,765 | 5/1965 | Offensend et al. | 353/26 |

*Primary Examiner*—William D. Martin, Jr.
*Attorney*—Robert W. Hampton and R. Lewis Gable

[57] ABSTRACT

Apparatus is disclosed for projecting images derived from information-bearing media (or information carriers) including first and second stations (or magazines) for receiving a plurality of the image-bearing media, a feed path disposed between the first and second stations, first and second lens means for projecting images derived from two information-bearing media and a storage station disposed with respect to the feed path for receiving and storing information bearing media.

15 Claims, 7 Drawing Figures

MANFRED LEUTWEIN
HEINZ STREICHER
SIEGFRIED RIEK
INVENTORS

BY P. Lewis Gable
Robert W Hampton

MANFRED LEUTWEIN
HEINZ STREICHER
SIEGFRIED RIEK
INVENTORS

BY R. Lewis Gable

Robert W Hampton

ATTORNEYS

MANFRED LEUTWEIN
HEINZ STREICHER
SIEGFRIED RIEK
INVENTORS

BY R. Lewis Gable
Robert W Hampton
ATTORNEYS

READER FOR INFORMATION CARRIERS IN SHEET FORM

CROSS-REFERENCES TO RELATED APPLICATIONS

Reference is made to commonly assigned copending U.S. Pat. application Ser. No. 875,815, entitled "Reader For Information Carriers in Sheet Form," filed Nov. 12, 1969 in the names of Heinz Streicher, Siegfried Riek, and Manfred Leutwein, and to commonly assigned copending U.S. Pat. application, Ser. No. 875,792, entitled "Reader for Information Carriers in Sheet Form," filed Nov. 12, 1969, in the names of Manfred Leutwein and Heinz Streicher.

BACKGROUND OF THE INVENTION

1. Field of the Invention

This invention relates to apparatus for projecting from images derived from an information-bearing medium or carrier, and in particular, to such projection apparatus for projecting images form more than one information bearing media, such as micorfiche cards and for displaying the plural images on distinct display surfaces.

2. Description of the Prior Art exemplified

Projection apparatus or readers of the type for projecting images from an information-bearing medium onto a display surface (or screen) are known in the art as exemplified by German Pat. No. 1,226,331. This patent discloses projection apparatus having a projection station disposed between first and second magazines for serving respectively as a supply magazine and as a deposit magazine for information-bearing media, such as microfiche cards. The information-bearing media are successively moved by a transport belt from the supply magazine to the projection station, and then to the deposit magazine. The projection station is mounted for sliding movement along two axes disposed at right angles to each other and in a plane parallel to the surface of the inserted media to enable an operator to move each of the images stored on the information-bearing medium to a position to be viewed upon the display screen. In this manner, each information-bearing medium in the supply magazine can be successively moved to a projection station for reading by the operator and then can be removed therefrom and disposed in the deposit magazine. However, it is only possible to project the images stored on the information-bearing medium onto the viewing screen one at a time and it is not possible to change the projection sequence determined by the order in which the information-bearing media are stacked on the supply magazine. Further, it is not possible to return the information-bearing media from the deposit magazine to the projection station or to project more than one image onto the display screen at a time.

Literature in the fields of science and technology, e.g., patents, may typically take the form of a test portion and an illustrated portion such as drawings, formulas or the like related to the text portion. To properly understand the information presented in this form, it is not only desirable but indeed often necessary to view the text portion and the illustrated portion in a contiguous relationship so that the observer may rapidly switch his attention between the text and the illustrated portions. This problem is especially acute in the searching and study of patents which typically take the form of a series of drawings and a text or specification portion, which describes the elements shown in the drawings by number. In order to fully understand the information being conveyed in the patent, it is highly desirable to refer readily to the drawings while reading the specification and claims. Easy reference to the drawings is often accomplished by placing the drawings and the text portions of the patent in a side-by-side relationship. It is rare that the descriptive text and the related drawing will be found together on the same page. Rather, the text and the drawing portions will be normally found on different pages and in addition, several pages of text may relate or describe a single drawing or several sheets of drawings may relate to a single page of text. In addition, there may be many pages of text and drawings that, taken together or separately, exceed the space available on a single sheet of the information-bearing material to record the desired information, thus making several microfiche cards necessary. In recording images from the document source onto information-bearing media such as microfiche cards, the pages of the document are successively recorded in a defined pattern onto the microfiche card, e.g., in rows and columns. As a result, the illustrative portion and the text portion may not be found on successive image portions of the microfiche card and it may be difficult to accurately access the related portions of the microfiche card. In all of these cases, reading recorded information contained on carriers or information-bearing media such as microfiche cards may be found to be incomplete, time consuming and unsatisfactory to the viewer.

An attempt to overcome the aforementioned problems and difficulties is described in French Pat. No. 54,403, which discloses a reader having a single viewing screen for the simultaneous projection of two images. However, the viewer differs generically from the reader of this invention in that two separate strips of film are used as information carriers. However, in projection apparatus of the type described in the above-identified French patent, both strips of film contain either the same information or one strip contains the text material and the other strip contains the illustrative material. Further, such projection apparatus will require two separate drive mechanisms to move the separate strips of the information-bearing material. Such prior projection apparatus is not adapted for use with information-bearing medium such as microfiche cards which, as opposed to carriers in strip form, are easier to handle and also may be readily changed to delete or add new information.

It is therefore the principal object of this invention to enable information of differing form such as textual and illustrative material to be projected from an information-bearing media such as microfiche and to permit the ready comparison of the different portions of the stored information.

SUMMARY OF THE INVENTION

This and other objects are met in accordance with the teachings of this invention by providing apparatus for projecting images from an information-bearing medium such as a microfiche card including first and second stations for receiving a plurality of the image-bearing media, a feed path disposed between the first and second stations, first and second lens assemblies disposed with respect to the feed path to project respectively the images from two separate information-bearing media, and a storage station disposed in communication with the feed path to project respectively the images from two separate information-bearing media.

This invention, its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
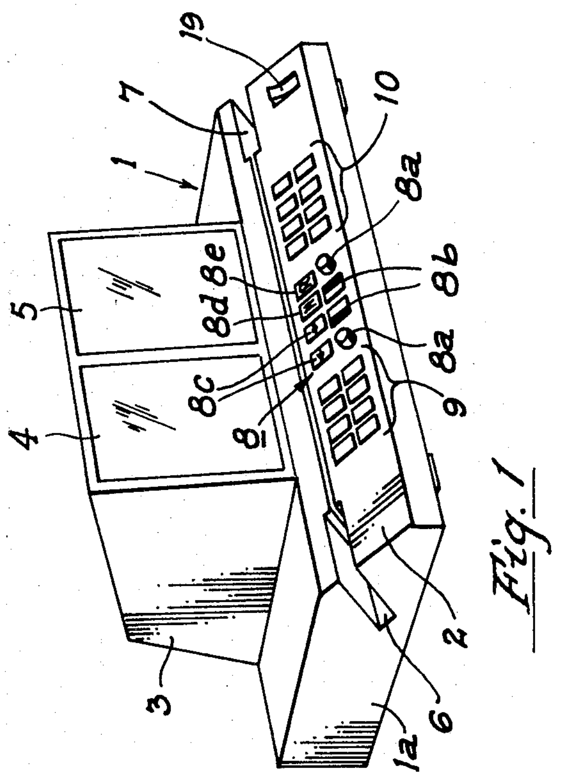
FIG. 1 is a perspective view of apparatus for projecting images in accordance with the teachings of this invention.

With reference now to the drawings and in particular to FIG. 1, there is shown an information-bearing media reader 1 including a base of portion 1*a* having a downwardly sloping control panel 2 and a top portion 3, the front wall of which is formed by two viewing screens or display surfaces 4 and 5. The base portion 1 is provided with a pair of rectangularly shaped recesses 6 and 7 at either end of the control panel 2 to define a feed path therebetween. The recesses 6 and 7 are accessible from the exterior of the reader 1 and are adapted to receive information-bearing media or aperture cards 11. Preferably, recesses 6 and 7 are so shaped or are provided with several blocking members to prevent the media 11 received therein from falling out of the recesses 6 and 7 The media or aperture cards 11 may be inserted in the recesses 6 and 7 in the form of loose stacks or may be first loaded into a pair of magazines 13 and 14 (see FIGS. 2, 3, and 5).

Figure 3:
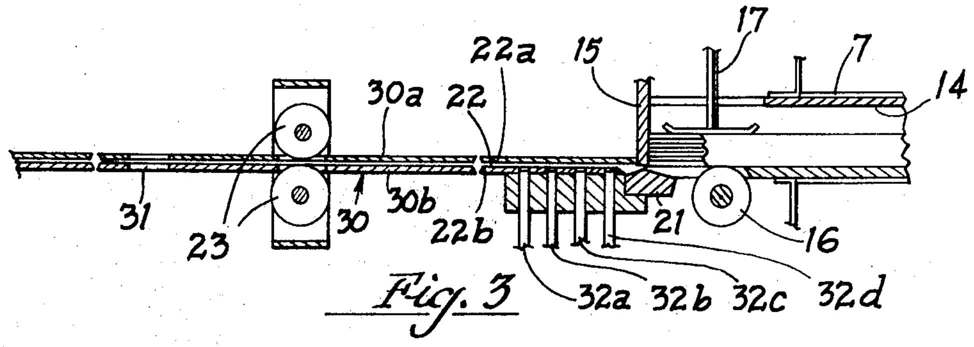
FIGS. 3, 4, and 5 are respectively enlarged, sectioned views of portions A, B, and C of the transport mechanism shown in FIG. 2.
Figure 5:
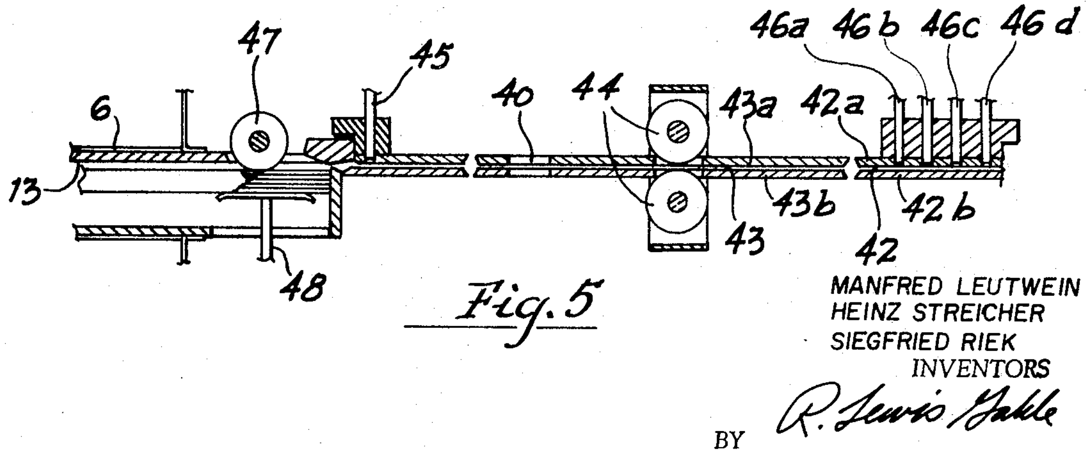

The use of magazines 13 and 14 is particularly advantageous because they not only protect the aperture cards 11 against damage but also allow the cards 11 to be stored in a systematic order. Preferably, the magazines 13 and 14 should be so configured and dimensioned to have a storage capacity of approximately 100 to 200 cards. As shown in FIGS. 3 and 5, apertures are provided through the walls of the magazines 13 and 14 so that the aperture cards 11 may be engaged by transport members 16 and 47 and be withdrawn or inserted from or into the magazines 13 and 14.

Figure 7:
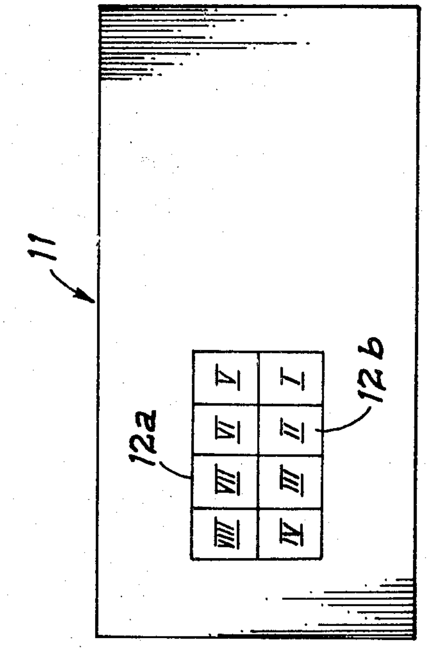
FIG. 7 is a view of an information-bearing medium such as a microfiche card to be projected and viewed in the apparatus of FIG. 1 to 6.

The information-bearing medium or aperture cards 11 may differ widely in the material of which they are made, their size and shape, and the manner in which the area of each sheet is subdivided. In general, however, the aperture card 11 should be preferably of uniform size. In the illustrative embodiment shown in FIG. 7, the aperture card 11 may be of a rectangular configuration and be made of a paper having a predetermined stiffness. Further, the card 11 medium has an aperture or window 12*a* to receive an information-bearing medium such as a film chip 12*b* mounted therein. As shown in FIG. 7, the film chip 12*b* may have a plurality of image portions I to VIII disposed in rows and columns thereon. In a preferred mode of operation of the information-bearing media reader 1, the transport mechanism may be adapted to dispose the image portion I of the film chip 12*b* in an aligned, projecting position after the card 11 has been moved into the reading station in a normal manner. The blank space of the card 11 may be used for taking notes or for coding to indicate the subject matter of the information stored on the film chip 12*a* and to be read off by suitable sensing apparatus.

Figure 2:
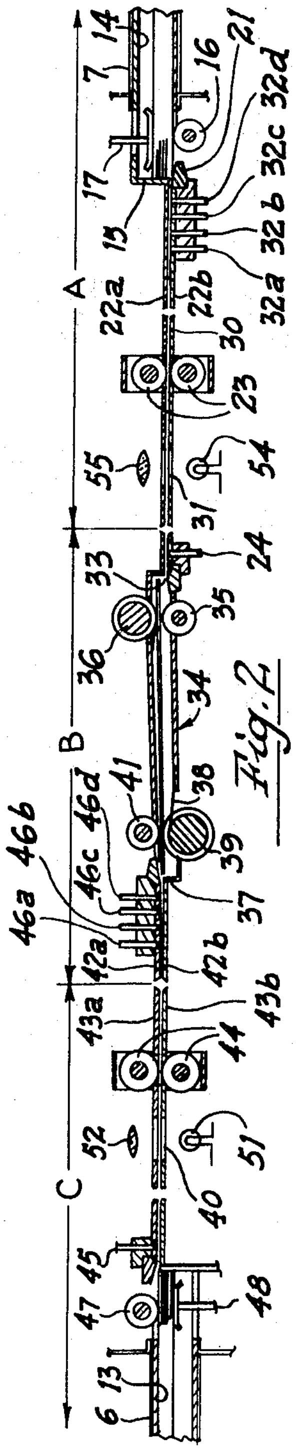
FIG. 2 is a sectioned view showing the transport mechanism for directing information-bearing media from a first station to an intermediate station and then to the second station, to be incorporated in apparatus as shown in FIG. 1.

As shown in FIG. 2, the recesses 6 and 7 provided in the base portion 1*a* serve as chambers for receiving one of the magazines 13 and 14 respectively. In practice, there should be an empty magazine for receiving the aperture cards 11 directed along the feed path between the magazines 13 and 14, and for serving as a depositry for receiving the viewed aperture cards 11. In the embodiment to be described, an empty magazine 13 is disposed in the recess 6 while the magazine 14, loaded with a stack of aperture cards 11, is inserted in recess 7.

As long as one of the magazines 13 and 14 is not in its operative position within the reader 1, the aperture cards 11 received therein are prevented from falling out of the magazine by blocking members provided on the front side of the magazines 13 and 14 in the form of flaps, for example. Upon insertion of one of the magazines 13 and 14, a release key or the like is operated manually or automatically to prepare the reader 1 for operation by withdrawing the blocking member extending into the path of movement of the aperture cards 11. Upon insertion of the magazine 14, the front edges of the aperture cards 11 disposed therein are moved against a stop member 15 which is fixedly assembled within the reader 1 as shown in FIGS. 2 and 3. In addition, the transport roller 16 is moved from a first or inoperative position to a second or card discharge position, and a holddown member 17 pressed the stack of aperture cards 11 so that the topmost card in the magazine 14 is brought into contact with the transport roller 16 to thereby be discharged.

Figure 6:
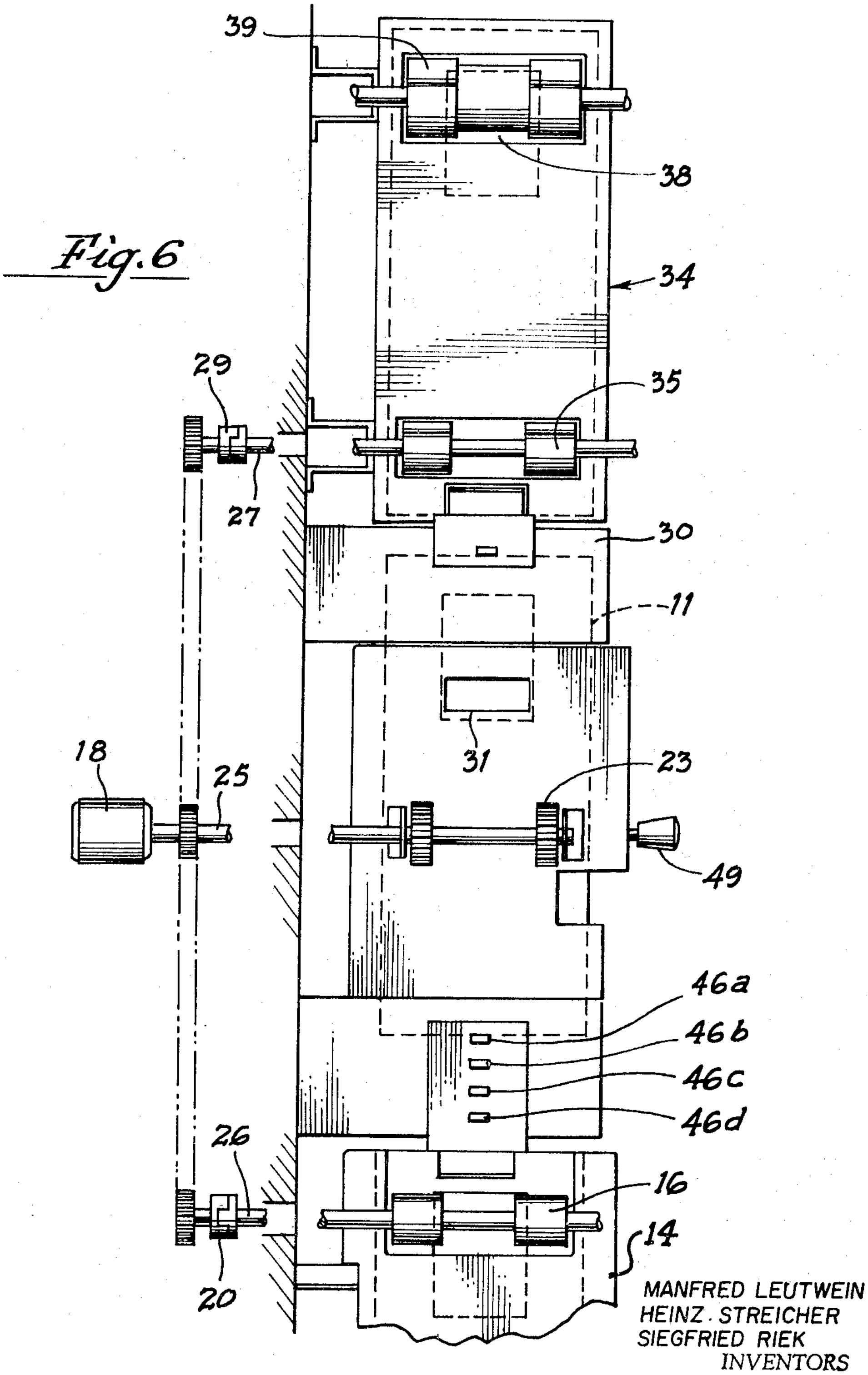
FIG. 6 is an enlarged plan view of the transport mechanism shown in FIGS. 2, 3, and 4.

Each half of the transport mechanism shown in FIG. 2 is driven by a reversible motor. The motor driving the right half of the transport mechanism as shown in FIG. 2 is designated with reference number 18. As shown in FIG. 6, the reversible motor 18 is connected respectively through drive or transport shafts 25, 26, and 27 to transport or drive rollers 23, 16 and 35. The transport shafts 26 and 27 may be disconnected from the reversible motor 18 by clutches 20 and 29.

Electrical power is supplied to the reader 1 by depressing the key or switch 19 disposed upon the control panel 2. The switch 19 serves to energize a pair of projection lamps 51 and 54. As will be described in greater detail later, the film chips 12b may be selectively disposed at the projection aperture 31 and 40, and to have selective images thereon focused by lens assembly 52 and 55 onto the display screens 4 and 5.

Figure 4:
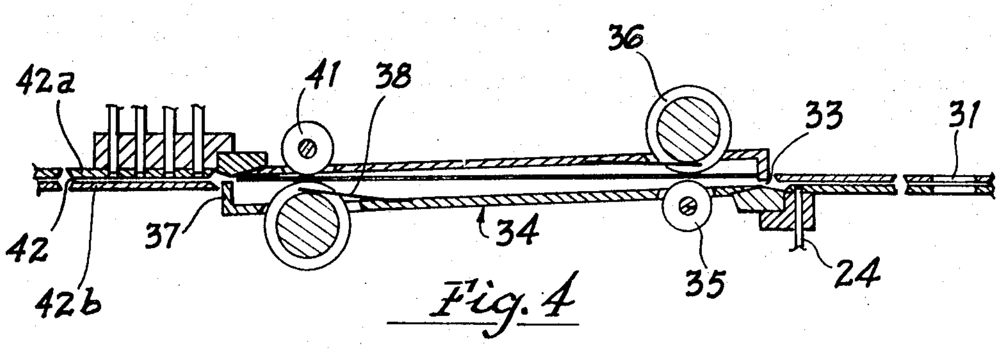

Upon actuation of the proper switch on control panel 2, the clutch 20 is energized to thereby permit the motor 18 to rotate the drive roller 16. In turn, the driver roller 16, which may be made of a single piece or of a plurality of pieces, pushes the bottommost aperture card 11 (as seen in FIG. 2) in the magazine 14 through a card gage or opening which is defined by the stop 15 and a counter lip or throat member 21. The dimension of the card gage is approximately the thickness of one aperture card 11 to thereby permit only one aperture card 11 to pass at a time. The aperture card 11 is directed through the gate a sufficient distance for the pair of friction or drive rollers 23 to engage the leading portion of the card 11 and to transport the card 11 to the left as seen in FIG. 2. To prevent the transport roller 16 from continuously withdrawing aperture cards 11 from the magazine 14, means are provided such as a microswitch to provide a central signal to render the clutch 20 inoperative when the aperture card 11 has been transported from the operating region of the transport roller 16. As seen in FIG. 3, a card 11 is directed through a channel 22 formed by a pair of guide members 22*a* and 22*b*. Further, a selectively operable stop member 24 is disposed as shown in FIGS. 2 and 4 to halt the movement of the aperture card 11 through the channel 22. When the stop member 24 has been disposed in its blocking position across the channel 22, the aperture card 11 will be directed against and will be stopped by the member 24 so that the aperture card 11 lies substantially within channel 22 of carriage 30 with the image portion of the film chip 12*a* designated by I aligned with respect to the projection aperture 31 (see FIGS. 2 and 6). As a result, the projection system made up of the projection lamp 54 and the lens assembly 55 will project the image portion I onto the viewing screen 5. If it is desired to project the image portions II, III or IV onto the viewing screen 5, the polarity of the potential applied to motor 18 is reversed by actuating the proper control on control panel 2 to thereby move the aperture card 11 to the right as shown in FIG. 3. One of a plurality of selectively operable stop members 32*a*, 32*b*, 32*c*, or 32*d* may be moved into the channel 22 to thereby stop aperture card 11 and to dispose the selected image portion into alignment with the projection aperture 31.

For viewing the image portion V to VIII, the operator may actuate the switches on control panel 2 to shift a carriage 30, on which is mounted the pair of drive rollers 23, to the left as shown in FIG. 6 by a distance corresponding to the height of one image portion. In a manner similar to that described above, one of the plurality of stop members 32 may be actuated to limit the lateral shifting of each image portion V to VIII and to position the selected image portion with respect to the projection aperture 31. Thus, a plurality of selector keys or switches 10 may be used in conjunction with control circuits to selectively position one of the image portions I TO VIII with respect to the aperture 31 for projection onto the viewing screen 5.

Typically, the entire series of documents are microfilmed in a manner that the first three, four, or five image portions of the film chip 12*b* contain especially important parts of the recorded document, e.g., information that would identify the nature of the document. As a result, it would be preferred to design the switching and control means for locating the carriage 30 such that the operator may choose in advance which of the eight image portions I to VIII is to be automatically projected first onto either the viewing screen 4 gr 5.

Before directing the aperture card 11 further along the transport mechanism, the carriage 30 is returned to its initial position if the card 11 had been shifted laterally. This operation clears the guide channel 22 so that the aperture card 11 may now be moved forward or backward as desired.

As shown in FIG. 6, the carriage 30 is provided with a lever system which an operator may manipulate by a handle or knob 49 to urge guide plates 30*a* and 30*b* apart. The aperture card 11 in the carriage 30 may then be removed or a new card 11 may be inserted. Such an operation would make it possible to vary the sequence in which the aperture cards 11 are stacked in one of the magazines or stations.

After the selected image portions of the film chip 12*a* have been projected through projection aperture 31, the aperture card 11 may be directed through a gate or opening 33 into an intermediate magazine or storage station 34. As the leading portion of the aperture card 11 reaches the operative region of the transport or drive roller 35 and a pressure roller 36, clutch 29 is engaged under the control of, for example, microswitches and the aperture card 11 is transported further until it reaches a stop member 37 which provides a surface against which the aperture card 11 abuts. Upon abutting the stop member 37, the rotational torque applied to the transport roller 35 is removed due to disengagement of the clutch 29. For example, suitable microswitches and circuitry may be provided to control the disengagement of the clutch 29. While the intermediate magazine 34 may vary widely according to storage capacity, it is suggested that the storage capacity be designed to accommodate approximately 35 aperture cards 11. To prevent overfilling of the intermediate magazine 34 and, as a consequence, a possible jamming of the transport channels leading thereto, microswitches or the like are provided in the intermediate magazine 34 to prevent additional aperture cards 11 from being transported into the magazine 34 and/or to cause cards 11 to be transported out of the magazine when the intermediate magazine 34 is substantially filled.

To insure that the aperture cards 11 already in the intermediate magazine 34 will not interfere with the aperture cards 11 entering the intermediate magazine 34, the nip formed by the transport roller 35 and the pressure roller 36 is in an accurately defined card feed position when the aperture cards 11 are transported from right to left as seen in FIG. 2, i.e., from the supply magazine 14 to the intermediate magazine 34. In this position, the transport roller 35 urges the aperture cards 11 directed into the intermediate magazine 34 upwardly a sufficient distance so that the gate 33 will be open for the next aperture card being moved into the intermediate magazine 34 from the right. A guide member 38 illustratively made of a resilient sheet of metal directs the aperture cards 11 over a pressure roller 39 and insures proper feeding, stacking, and discharging of the aperture cards 11 from the intermediate magazine 34.

If an aperture card 11 is to be moved from the intermediate magazine 34 to the left-hand viewing position, as seen in FIG. 2, as defined by the projection aperture 40, the transport roller 41 is rotated to direct the topmost card in the stack stored in the intermediate magazine 34 through the aligned channels 42 and 43. As seen in FIG. 5, the channels 42 and 43 are respectively defined by guide members 42*a* and 42*b* and 43*a* and 43*b*. The aperture card 11 will continue to be moved through the channels 42 and 43 until it reaches the pair of transport or drive rollers 44, whereupon the transport roller 41 is stopped and the aperture card 11 is removed from the operative region of the transport roller 41 and the pressure roller 39. The aperture card 11 will be moved to the left as seen in FIGS. 2 and 5 until the front edge of the aperture card 11 abuts a selectively operable stop member 45, which serve to block the feed path along the transport mechanism. In this position, a selected portion of the film chip 12*b* will be disposed in alignment with the projection aperture 40 to thereby be projected by the projection lamp 51 and the lens assembly 52 onto the display screen 4. Further, the operator may, by means of the control panel 2, control the movement of the second carriage and the selective actuation of one of the stop members 46*a*, 46*b*, 46*c*, and 46*d* to thereby selectively project one of the image portions I to VIII onto the viewing screen 4. The movement of the aperture card 11 in a lateral direction and in a direction along the path of card movement may be accomplished in a manner similar to that described above.

The aperture cards 11 may be moved from the viewing position as defined by the projection aperture 40 into the left-hand magazine 13 (as seen in FIG. 5) by activating the transport rollers 44 which feeds the aperture cards 11 to a defined card feed position of the transport roller 47. As shown in FIG. 5, a counter holder or holddown member 48 exerts a resilient pressure via the stack of aperture cards 11 upon the transport roller 47.

The direction of card movement of the transport system may be controlled either as a unit or as separate parts which may be reversed at the discretion of the operator. More specifically, the rotation of the transport rollers 16, 35, 41, 47, 23 and 44 may be reversed by applying a potential of different polarity to the drive motors. With regard to FIGS. 2 and 4, it may be noted that transport rollers 16 and 47 may be selectively moved from a first position remote from the stack of cards 11 thus permitting the cards 11 to be inserted into the stack to a second position wherein the transport rollers 16 and 47 engage the topmost card in the stack. In a similar manner, transport rollers 41 and 35 are disposable from a first position which allows the aperture cards 11 to be directed through the adjacent gate to a second position which prevents the card 11 from being discharged back through this gate that it has entered. Thus, when it is desired to reverse the direction of card movement from that described above, it would be necessary to move the transport roller 16 and 41 from their card discharge positions to their card feed positions while moving the transport rollers 35 and 47 from their card feed positions to their card discharge positions. Thus, it is apparent that either magazine 13 or 14 may serve as a deposit magazine or station, depending on whether the cards 11 are transported to the left or right as seen in FIG. 2. When all the aperture cards 11 constituting a card series are received in a single magazine, that magazine may be removed from the reader and placed into storage. It is particularly important that the sequence of the cards in the magazine is not altered by the transport operation as the card 11 is moved through the reader 1. As a result, to properly store or identify the entire stack of cards, it would be sufficient to mark the first card of a series with appropriate indicia and to provide an aperture through the magazine wall so that the indicia may be easily viewed.

The operation of the transport system of the reader 1 of the present invention is controlled from the control panel 2. As shown in FIG. 1, the control panel 2 is provided with the on/off switch 19 and a first group of switches 9 to control which image is to be projected onto the screen 4 and a second group 10 of switches to control which image is to be projected onto the display screen 5. In addition, a pair of rotary knobs 8*a* serve to adjust the position of the lens assemblies 52 and 55 to focus the respective images onto the display screens 4 and 5. The intermediately disposed keys or switches 8b are used to selectively activate the right or left half of the transport system and the movement of the aperture cards 11 into the intermediate magazine 34. Further, the two keys or switches 8*c* serve to control the direction of the card movement in a forward or reverse direction of the card movement in a forward or reverse direction as indicated by the arrows on the keys. Depression of the key or switch 8 *d* causes the normal transport operation of the viewer, whereas the depression of key or switch 8*e* causes the clearing of the intermediate magazine 34.

As mentioned above it may be desirable to record a scientific treatise such as a patent having illustrative and text portions onto an aperture card 11 as shown in FIG. 7. If for example the scientific treatise has 32 pages of text accompanied by any number of associated sheets of drawings or other illustrations, the document could be recorded onto four aperture cards 11 in a 4 x 2 format. The four aperture cards 11 could be arranged anywhere in the supply stack sequential order and may be proceeded or followed by the aperture cards 11 bearing the drawings and illustrations. If in reading the text portions of the document, the operator desires to simultaneously view on the screen the associated drawings, he need only operate the controls for the transport mechanism to move the first text card from the supply stack to the first reading station for projecting the selected image onto the display screen 4. Next, the subsequent text cards are moved into the intermediate storage magazine 34 and the additional aperture cards containing the drawings may be successively disposed at the second reading station to be displayed upon the screen 5. After all the image portions on the first text card have been sequentially moved into alignment with respect to the projection aperture 40, the first text card is moved to the deposit stack and is replaced by the next text card which is withdrawn from the intermediate storage station 34. If in reading the text displayed upon the screen 4, the operator desires to sequentially project on the screen a plurality of drawings, the image portions relating to the illustrative material may be moved to the projection aperture 31 and may be projected one after another onto the display screen 5. If there are additional drawings, the first illustrative card may be moved to the last position in the intermediate storage station 34 and be replaced by the next illustrative card from the supply stack. Such as operation may be repeated any number of times depending on the number of cards involved. It is particularly advisable to arrange the intermediate storage station 34 substantially in the middle of the transport mechanism.

From the description given above, it may be readily understood that a reader comprising the subject invention is easy to operate and permits information-bearing media to be successfully transported from a first station for receiving a plurality of media along a feed path (or transport mechanism) via a first viewing position, an intermediate storage station or magazine and a second viewing position to a second station for receiving a plurality of the cards disposed at the other end of the feed path. As described above, the aperture cards may be transported in either direction along the transport mechanism and the image portions of the film chips may be individually projected onto a viewing screen at the discretion of the operator. Further, any combination of two image portions belonging to different aperture cards may be simultaneously projected onto the viewing screens for simultaneous study and comparison.

The invention has been described in detail with particular reference to a preferred embodiment thereof, but it will be understood that variations and modifications can be affected within the spirit and scope of the invention.

We claim:

1. Apparatus for projecting images derived from information-bearing media, said apparatus comprising:
first and second stations for receiving a plurality of the image-bearing media;
a feed path disposed between said first and second stations to permit the transport of image-bearing media therebetween;
first and second lens means disposed with respect to said feed path to project images respectively from two information-bearing media; and
a storage station disposed between said first and second stations at a position separate from said first and second lens means for receiving and storing information bearing media directed along said feed path.

2. Apparatus for projecting images derived from at least first and second information-bearing media, said apparatus comprising:
first and second stations for receiving a plurality of the image-bearing media;
a feed path disposed between said first and second stations to transport the information-bearing media therebetween;
first and second projection means disposed with respect to said feed path to project images respectively from the first and second information-bearing media; and
a storage station disposed between said first and second projection means for receiving and storing the information-bearing media directed along said feed path.

3. Apparatus as claimed in claim 2, wherein there is included first and second display surfaces for displaying the images projected thereon by said first and second projection means.

4. Apparatus as claimed in claim 2, wherein said first and second station includes respectively first and second magazines for receiving the plurality of the information-bearing media.

5. Apparatus as claimed in claim 4, wherein said first and second stations each include a drive roller for discharging the information-bearing media one at a time from the stack of the information-bearing media, and means for resiliently pressing the received plurality of information-bearing media against said drive roller.

6. Apparatus as claimed in claim 2, wherein said storage station is disposed substantially midway between said first and second stations.

7. Apparatus as claimed in claim 2, wherein said storage station includes means for defining first and second openings into said storage station, a first drive roller and a first pressure roller for directing the information bearing media through said first opening, and a second drive roller and a second pressure roller for directing the information-bearing media through said second opening.

8. Apparatus as claimed in claim 7, wherein said storage station includes first and second guide member for providing respectively first and second surfaces, said first and second surfaces disposed respectively to direct the information-bearing media over said first and second pressure rollers as the information-bearing media are directed through said storage station.

9. Apparatus as claimed in claim 2, wherein said storage station includes means for defining first and second openings into said storage station; and first and second drive rollers each disposable from a first position for discharging an information-bearing medium from said storage station to a second position for directing information-bearing media into said storage station.

10. Apparatus as claimed in claim 2, wherein said storage station includes means for defining first and second openings into said storage station; a first pair of rollers forming a first nip therebetween, said first pair of rollers movable from a first position wherein said first nip is aligned with said first opening and said feed path and a second position wherein said first nip is offset from said first opening and said feed path; and a second pair of rollers forming a second nip therebetween, said second pair of rollers movable from a first position wherein said second nip is aligned with said second opening and said feed path and a second position wherein said second nip is offset from said second opening and said feed path.

11. Apparatus as claimed in claim 2, including first and second carriage means for receiving one of the information-bearing media having a plurality of information-bearing portions and for moving the one information-bearing media with respect to said first and second projection means respectively to thereby project differing image portions.

12. Apparatus as claimed in claim 11, wherein said first and second carriage means includes respectively first and second projection apertures aligned respectively with said first and second projection means and first and second transport rollers for moving the information-bearing media with respect to said first and second projection apertures respectively.

13. Apparatus as claimed in claim 11, wherein there is included means for facilitating the insertion and removal of the information-bearing media into and from said first and second carriage means.

14. Apparatus as claimed in claim 2, wherein there is included first and second carriage means for receiving one of the information-bearing media having a plurality of image portions, said first and second carriage means having respectively first and second projection apertures associated respectively with said first and second projection means, first and second drive means for moving the information bearing media with respect to said first and second projection apertures, and first and second pluralities of stop members, said stop members being movable from a first position remote from said feed path to a second position to intercept the information-bearing media as they are moved along said feed path, said stop members being disposed with respect to said projection aperture at incremental distances corresponding to the arrangement and spacing of the image portions on the information-bearing media.

15. Apparatus as claimed in claim 2, wherein there is included transport means for directing the information-bearing media one at a time along said feed path, said transport means being operable to move the information-bearing media from said first station to said second station and from said station to said first station.

* * * * *